Oct. 18, 1949.   R. S. MacCAFFRAY, JR   2,485,396
FRINGE MACHINE
Filed Jan. 23, 1947   17 Sheets-Sheet 1
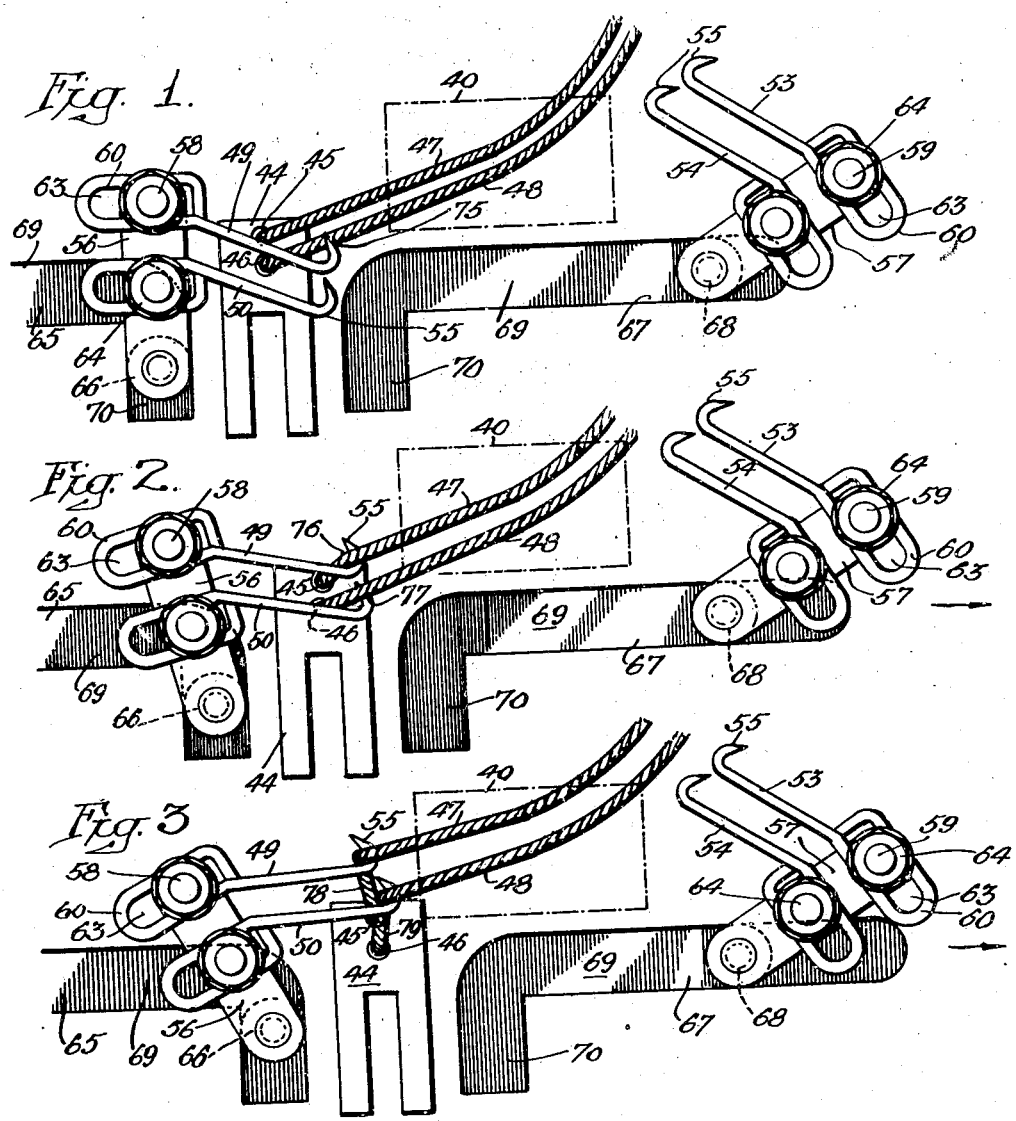
INVENTOR.
Rex Stuart MacCaffray Jr
BY
ATTORNEYS.

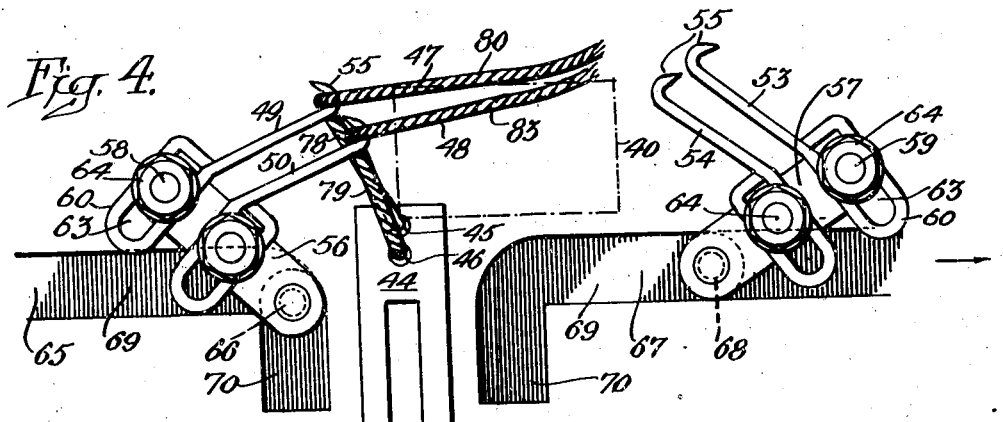

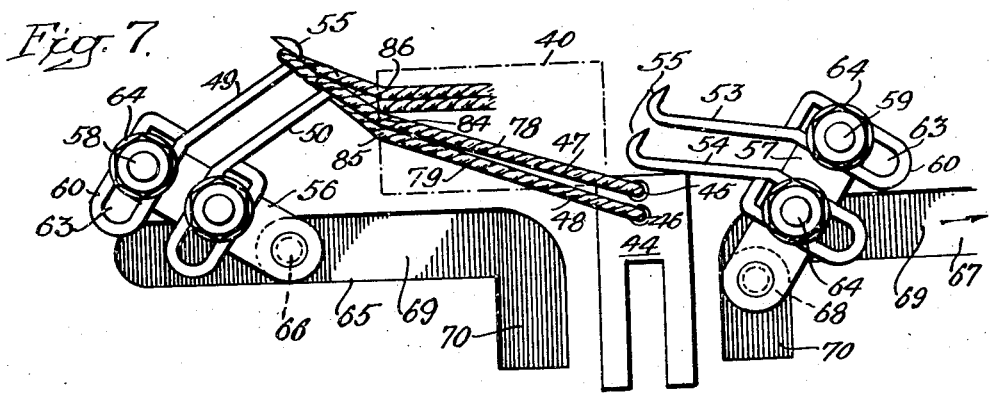
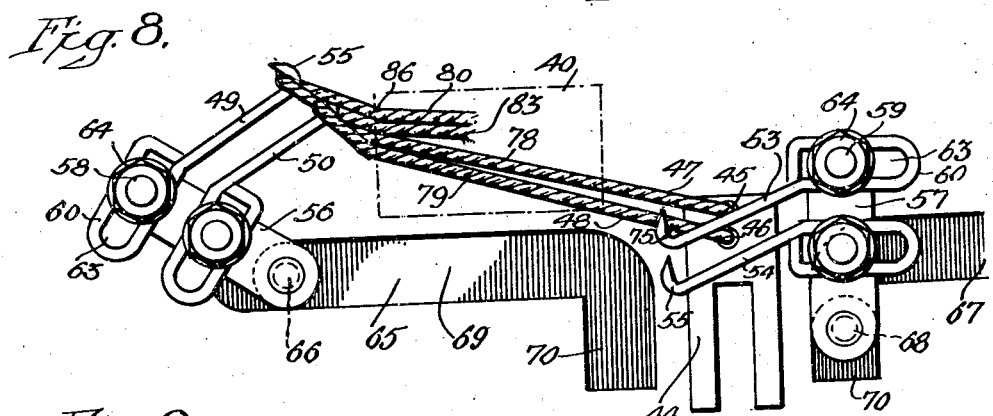
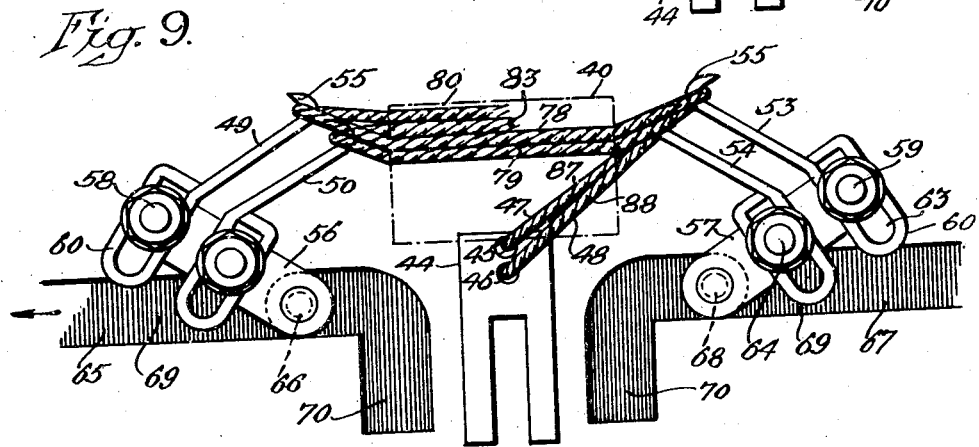

Oct. 18, 1949.  R. S. MacCAFFRAY, JR  2,485,396
FRINGE MACHINE
Filed Jan. 23, 1947  17 Sheets-Sheet 5

INVENTOR.
Rex Stuart MacCaffray Jr
ATTORNEYS.

Oct. 18, 1949.  R. S. MacCAFFRAY, JR  2,485,396
FRINGE MACHINE
Filed Jan. 23, 1947  17 Sheets-Sheet 7

INVENTOR.
Rex Stuart MacCaffray Jr.
BY
ATTORNEYS.

Oct. 18, 1949.  R. S. MacCAFFRAY, JR  2,485,396
FRINGE MACHINE
Filed Jan. 23, 1947  17 Sheets-Sheet 9

INVENTOR.
Rex Stuart MacCaffray Jr
BY
ATTORNEYS.

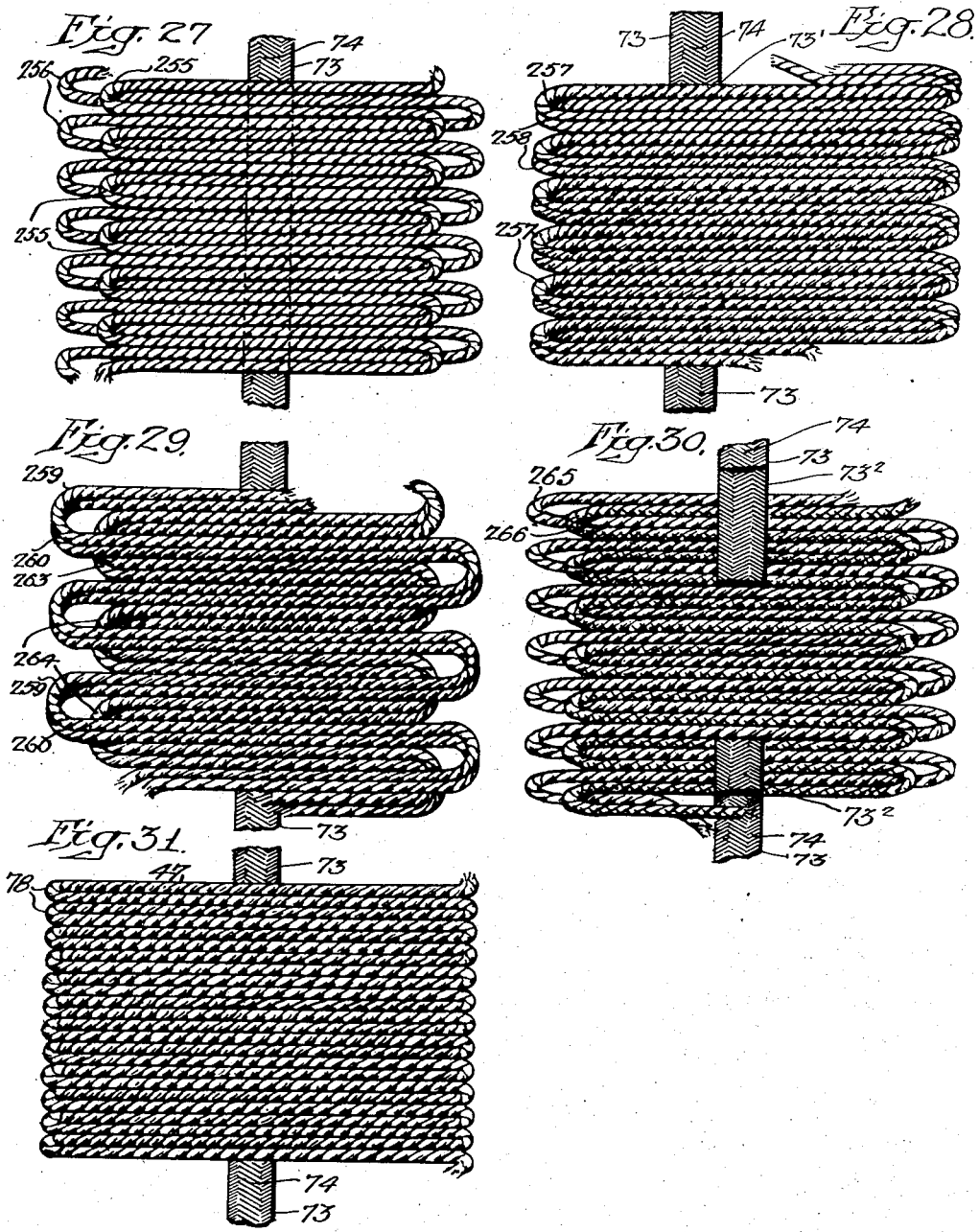

Oct. 18, 1949.  R. S. MacCAFFRAY, JR  2,485,396
FRINGE MACHINE
Filed Jan. 23, 1947  17 Sheets-Sheet 12
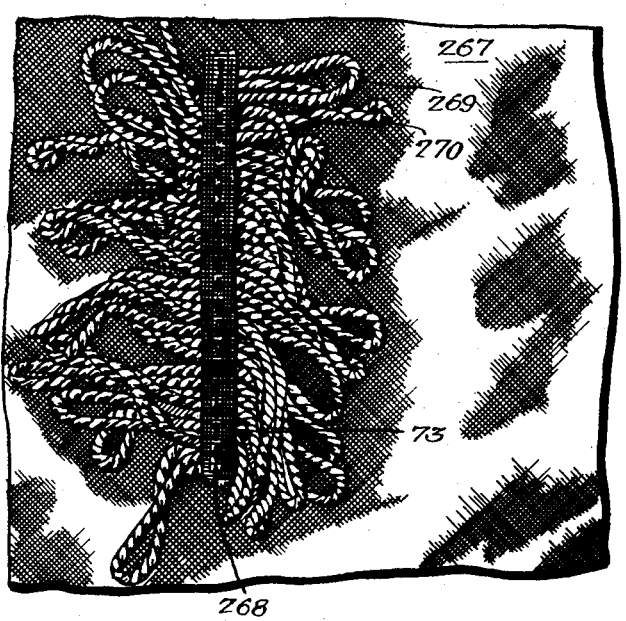
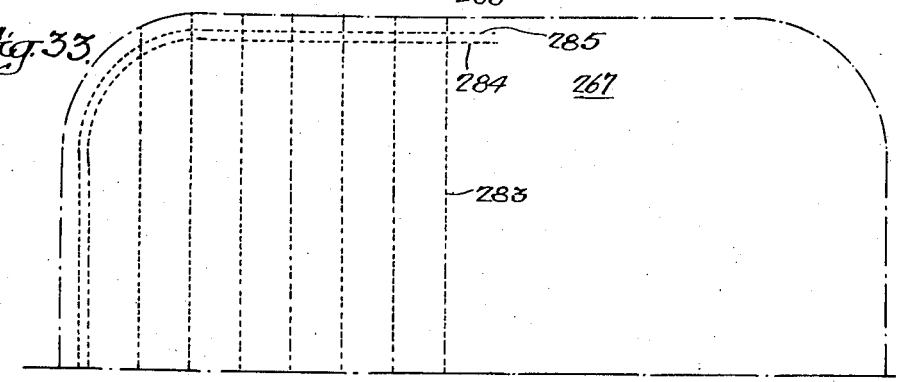
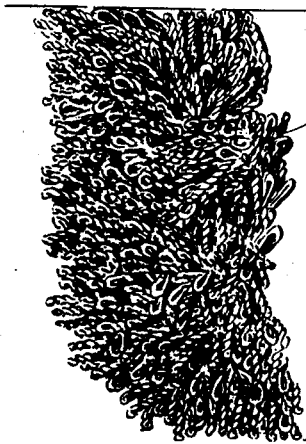
INVENTOR.
Rex Stuart MacCaffray Jr
BY
ATTORNEYS.

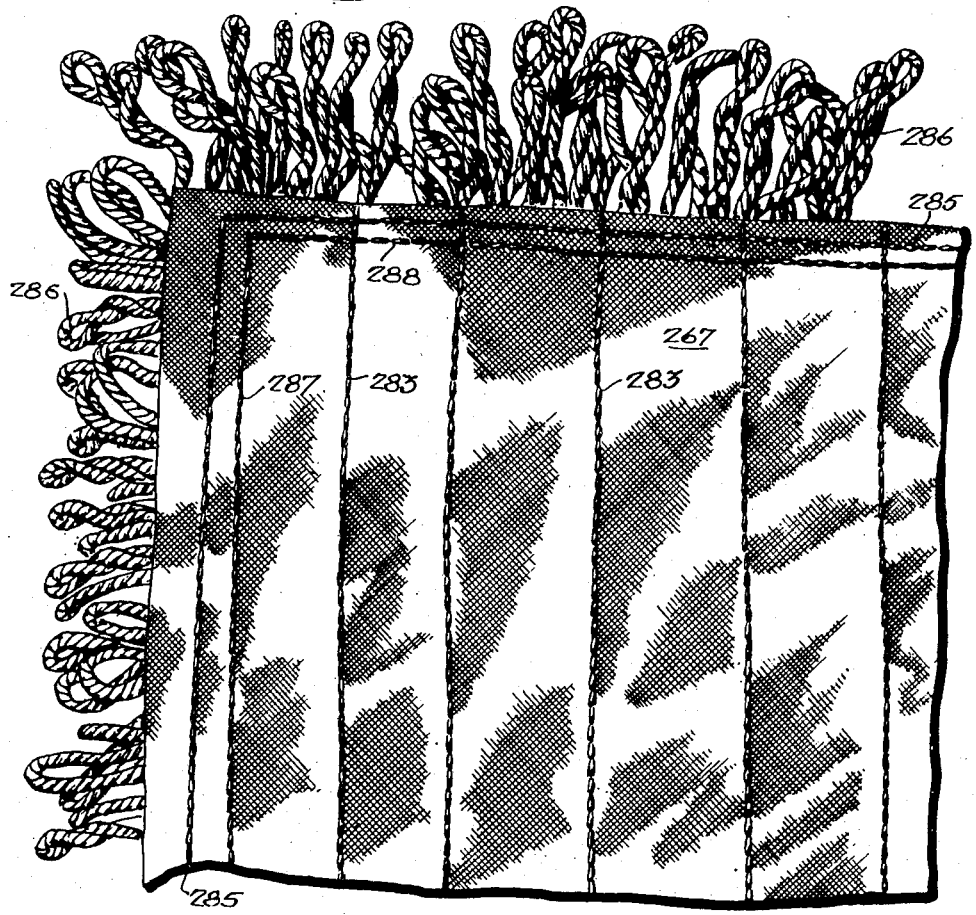

Oct. 18, 1949.　　　R. S. MacCAFFRAY, JR　　　2,485,396
FRINGE MACHINE

Filed Jan. 23, 1947　　　　　　　　　　　17 Sheets-Sheet 15

INVENTOR.
Rex Stuart MacCaffray Jr.
BY
ATTORNEYS.

Oct. 18, 1949.　　　R. S. MacCAFFRAY, JR　　　2,485,396
FRINGE MACHINE

Filed Jan. 23, 1947.　　　　　　　　　　　17 Sheets-Sheet 16

INVENTOR.
Rex Stuart MacCaffray Jr.
BY
ATTORNEYS.

Oct. 18, 1949. R. S. MacCAFFRAY, JR 2,485,396
FRINGE MACHINE
Filed Jan. 23, 1947 17 Sheets-Sheet 17

INVENTOR.
Rex Stuart Mac Caffray Jr.
BY
ATTORNEYS.

Patented Oct. 18, 1949

2,485,396

UNITED STATES PATENT OFFICE 2,485,396

FRINGE MACHINE

Rex Stuart MacCaffray, Jr., Boiling Springs, Pa., assignor to C. H. Masland & Sons, Carlisle, Pa., a corporation of Pennsylvania Application January 23, 1947, Serial No. 723,778

13 Claims. (Cl. 154—1.76)

My invention relates to machines for making fringe.

The present invention relates to species, invented by me, of a broad invention of Charles H. Masland, 2nd, Serial No. 723,756, filed June 23, 1947, for Fringe machine, process and product.

A purpose of my invention is to form fringe, using hook needles and cooperating rolls, by moving yarn back and forth, hooking needles behind the yarn near the ends of its travel and thereby forming loops, feeding tape having adhesive on the side toward the yarn between the rolls transverse to the roll axes and to the loops, pulling the loops held by the hook needles into the rolls and thereby securing the loops by the adhesive to the tape.

A further purpose is to swing the needles about pivots to engage the hooks behind the yarn and to advance the hooks on the needles beyond the roll axes at the ends of the rolls and thereby pull the loops into the nip of the rolls and secure the loops by the adhesive to the tape.

A further purpose is to swing the hooks forward at the ends of the rolls alternatively in coordination with the reciprocation of the yarn.

A further purpose is to employ a plurality of yarns, which may be alternatively looped over the same set of hook needles or over a plurality of sets of hook needles, so that the loops may follow the same path or different paths.

A further purpose is to mount the yarn carrier on a carriage and to pivot needle carriers adjacent opposite ends of the stroke of the yarn carrier on the carriage.

A further purpose is to locate cams preferably of opposite L-form on the carriage on opposite sides of the yarn carrier, and to swing the needle carriers by followers thereon which engage in the cams.

A further purpose is to employ multiple needles on each needle carrier and, in the retracted position, to move one needle so that it overlies a particular yarn and can subsequently move forward without danger of hooking behind that yarn.

A further purpose is to employ multiple needles which reach different ultimate positions at the side and therefore form loops of different lengths.

A further purpose is to set adhesive fixing loops of yarn to tape to form a fringe, by progressing the fringe around a drum between the drum surface and a pressure belt following the drum surface.

A further purpose is to drive a double set of upper and lower rolls, over which pressure belts extend, by directly driving one lower roll, interconnecting this to the mating upper roll at one end, driving the other upper roll from the first upper roll, and driving the other lower roll from the other upper roll at the opposite end, the upper rolls floating in bearings and the drive continuing notwithstanding variation in the spacing under spring action during the floating.

Further purposes appear in the specification and in the claims.

In the drawings I have chosen to illustrate a few only of the embodiments in which my invention appears, choosing forms convenient in illustration, satisfactory in operation, and clear in demonstration of the principles involved.

Figures 1 to 12 inclusive are fragmentary diagrammatic top plan views showing the progressive steps of forming the loops and cementing them on the tape to make a fringe.

Figures 15 to 18 inclusive illustrate in more complete detail one machine to manufacture the fringe.

Figure 15:
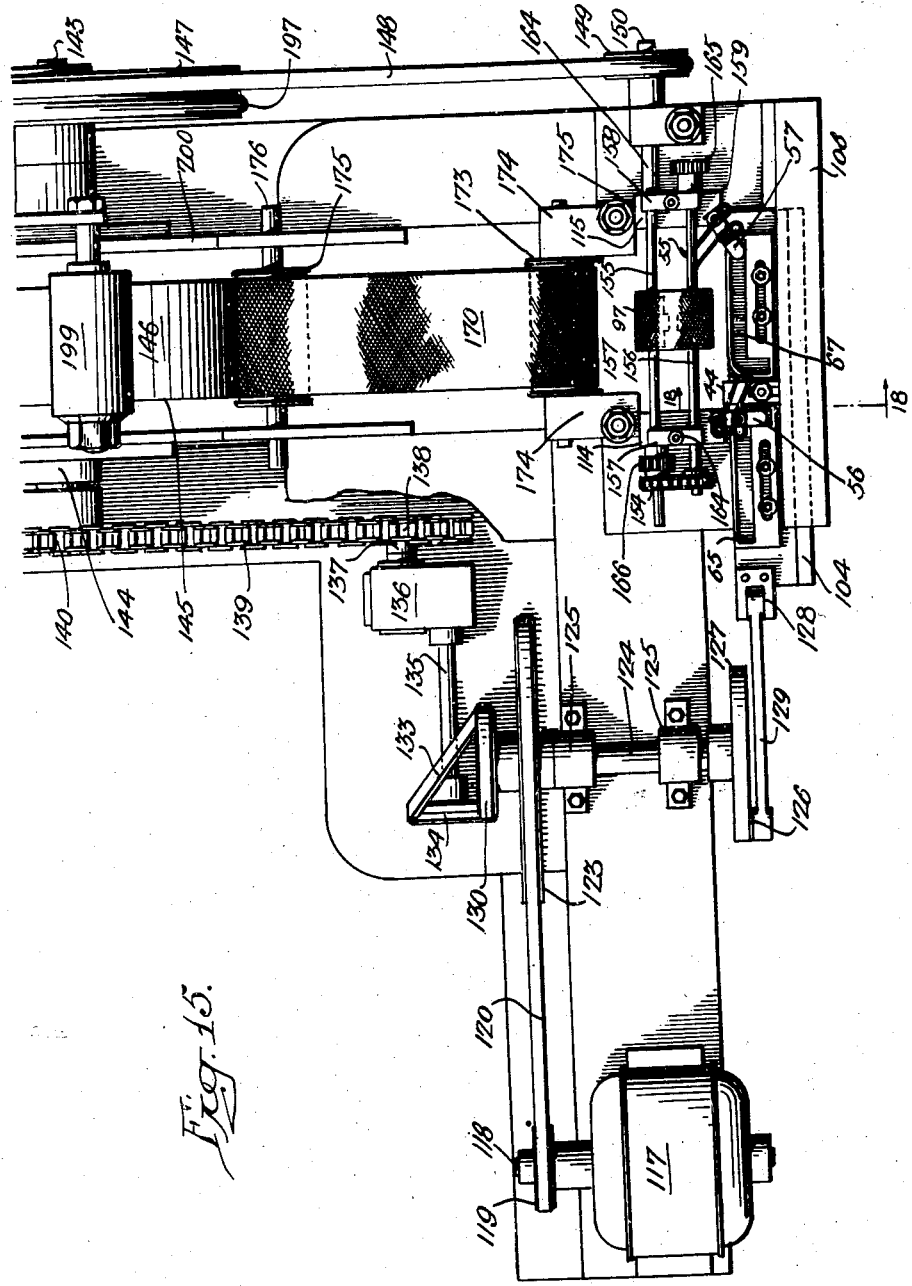

Figure 15 is a fragmentary top plan view of the improved machine.

Figure 16:
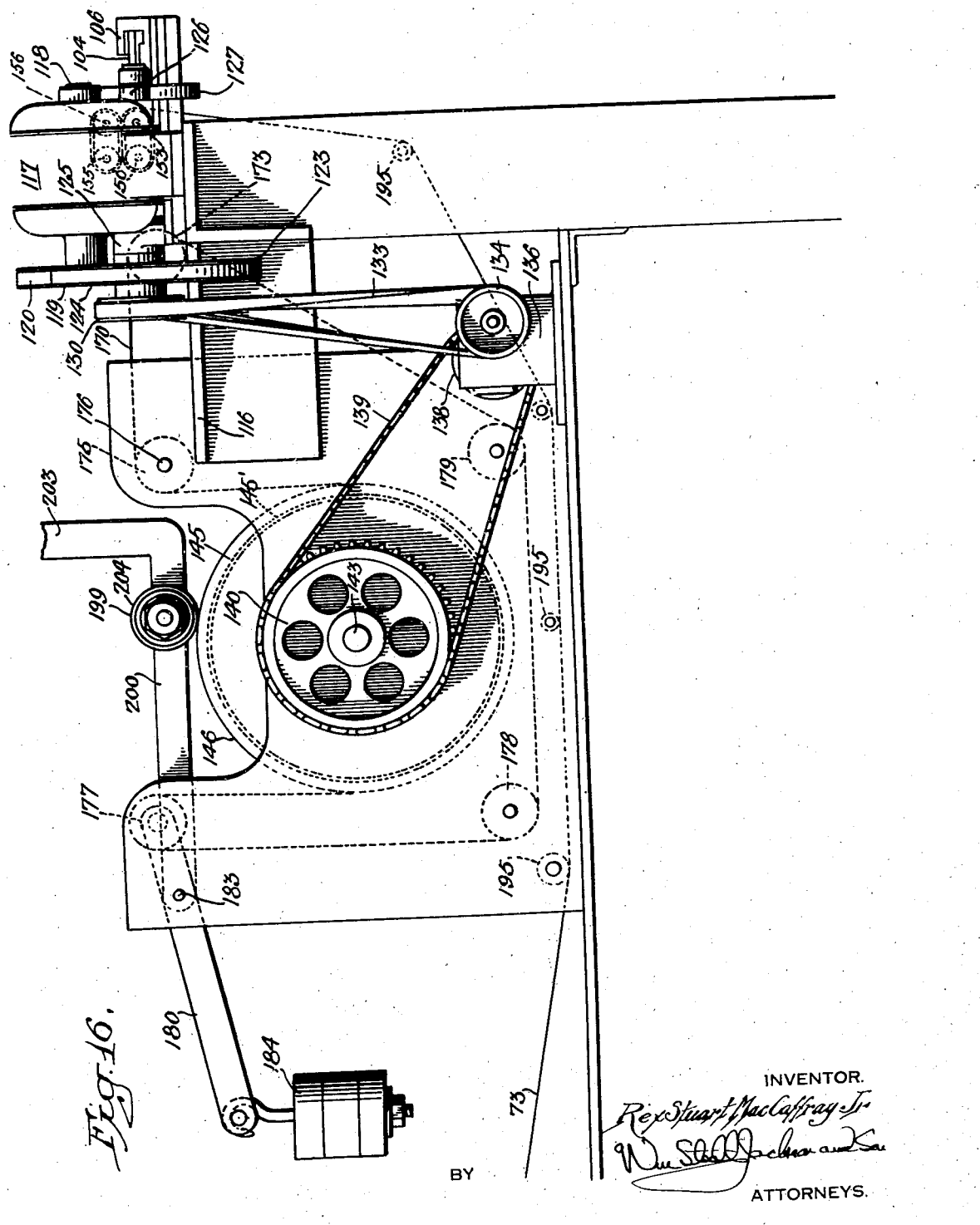

Figure 16 is a side elevation corresponding to a view from the left in Figure 15.

Figure 17:
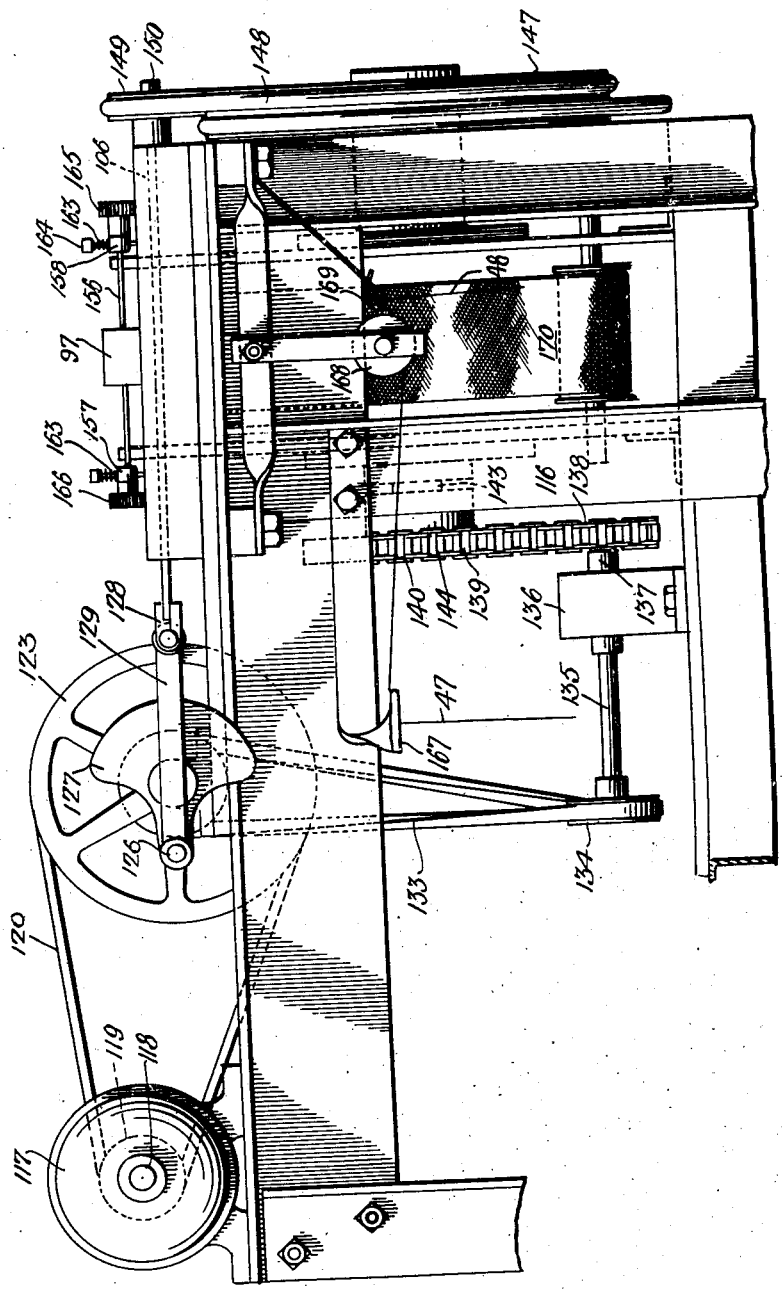

Figure 17 is a front elevation of Figure 15.

Figure 18:
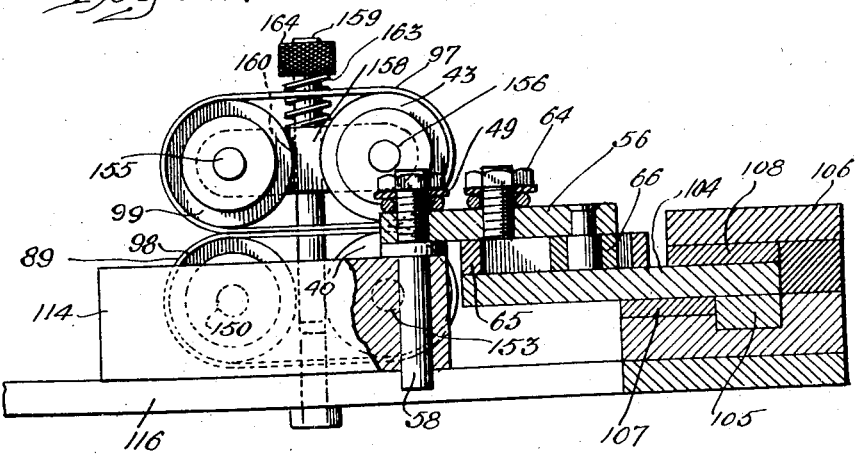

Figure 18 is an enlarged section on the line 18—18 of Figure 15.

Figure 19:
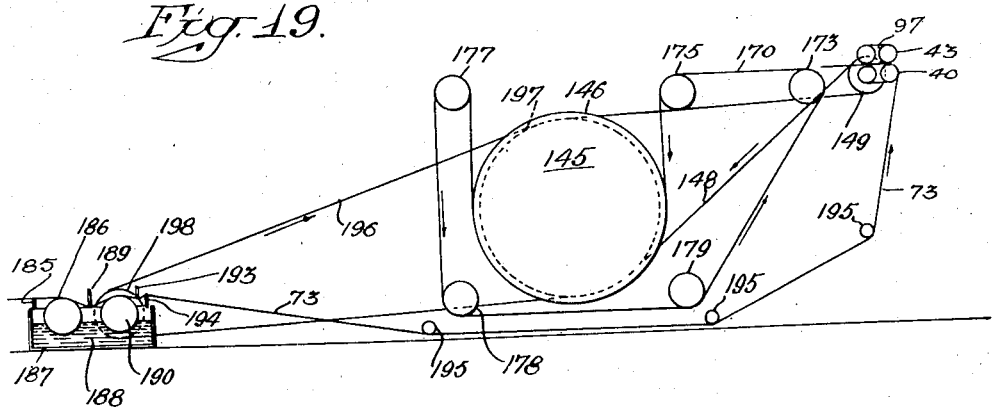

Figure 19 is a diagrammatic view corresponding in position to Figure 16, and illustrating the paths of the tape, the pressure belt and related elements.

Figure 11:
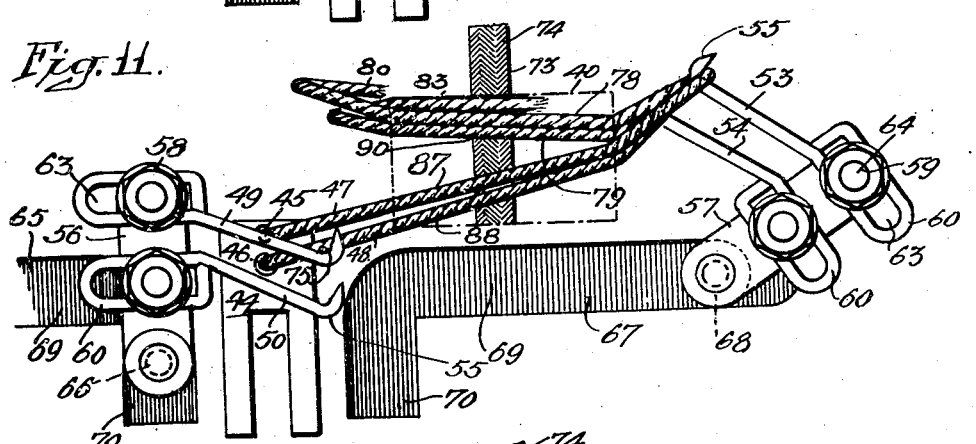

Figures 20 to 26 inclusive are views corresponding in positon to Figure 11, and showing variations in the needles, yarn carrier, and yarns.

Figures 27 to 31 inclusive illustrate variations in the character of the fringe itself, as shown in fragmentary top plan views of the fringe as formed, or bottom plan views of the fringe as applied to the rug.

Figure 32 is a fragmentary top plan view showing a single row of fringe applied to a backing in forming a rug, in accordance with the invention of Charles H. Masland, 2nd.

Figure 33 is a partially diagrammatic fragmentary top plan view of a rug employing the fringe of the invention.

Figure 34 is a bottom plan view of a fragment of a square cornered rug employing the fringe of the invention.

Figure 35:
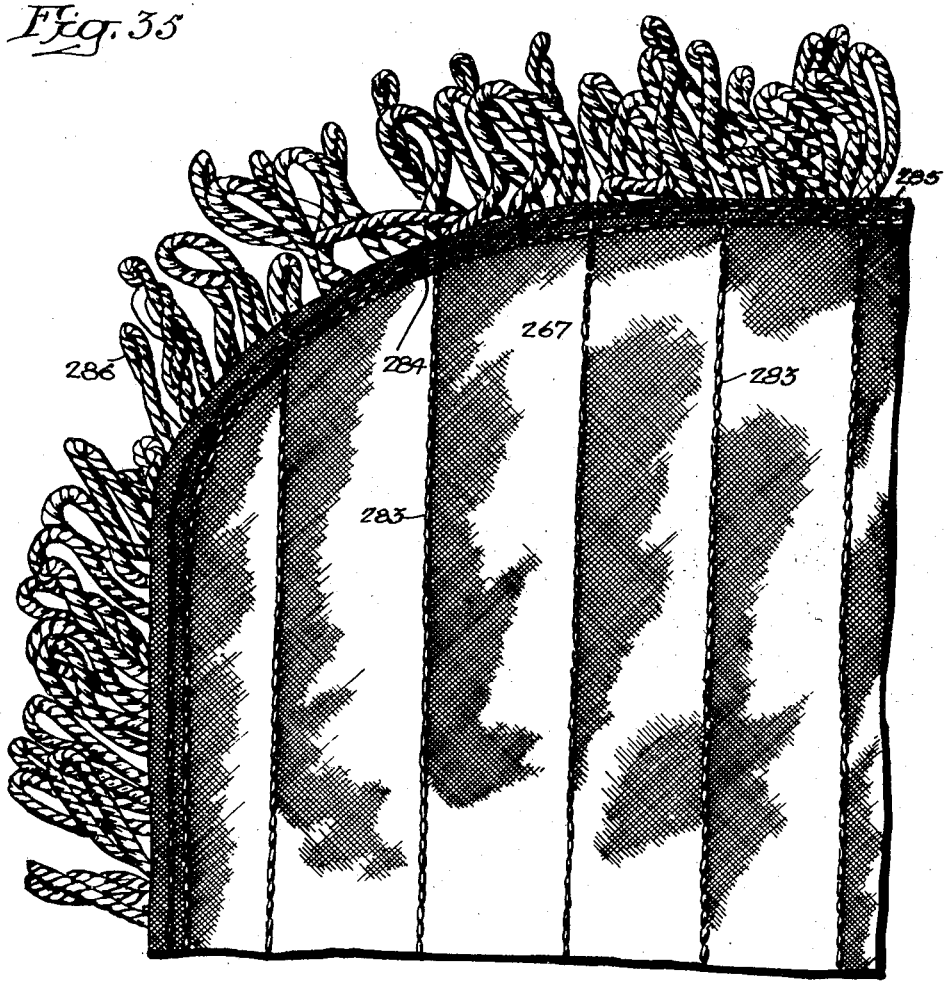

Figure 35 is a fragmentary bottom plan view of a round cornered rug employing the fringe of the invention.

Figure 36:
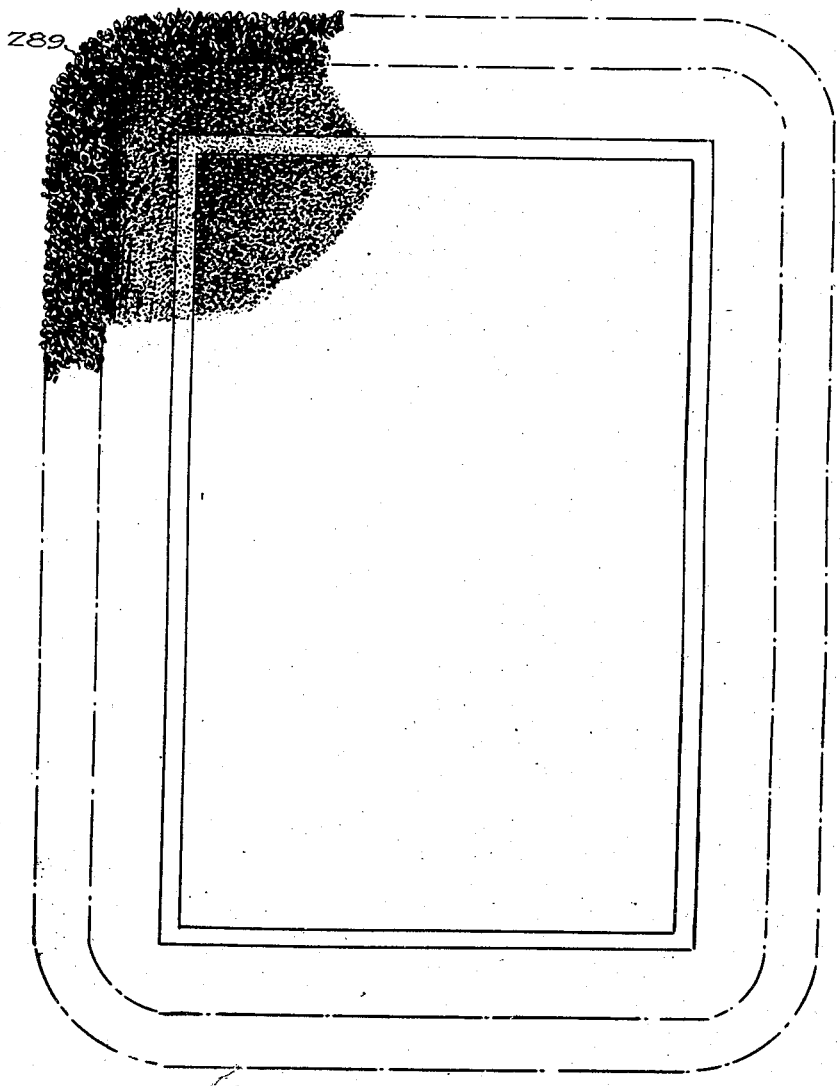

Figure 36 is a fragmentary top plan view of a fringe according to the invention applied as a border around a rug having a face of another character.

Figure 37:
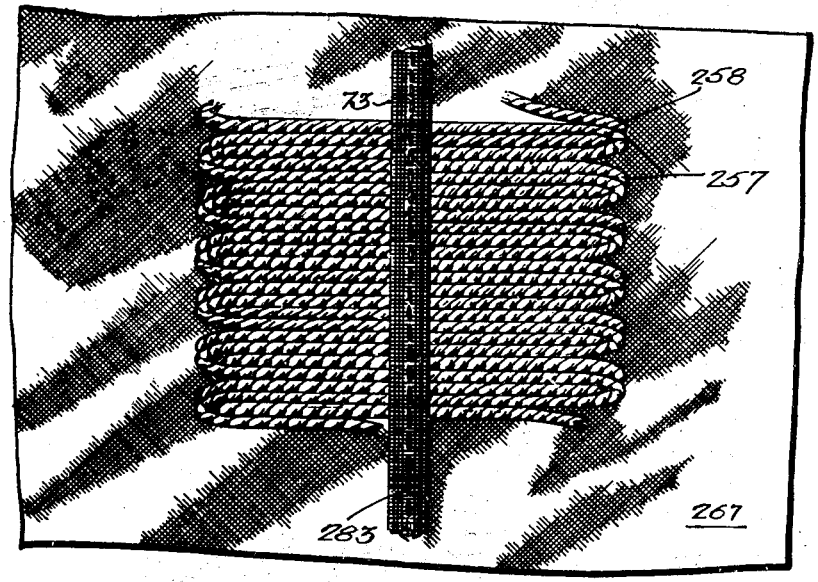
Figure 38:
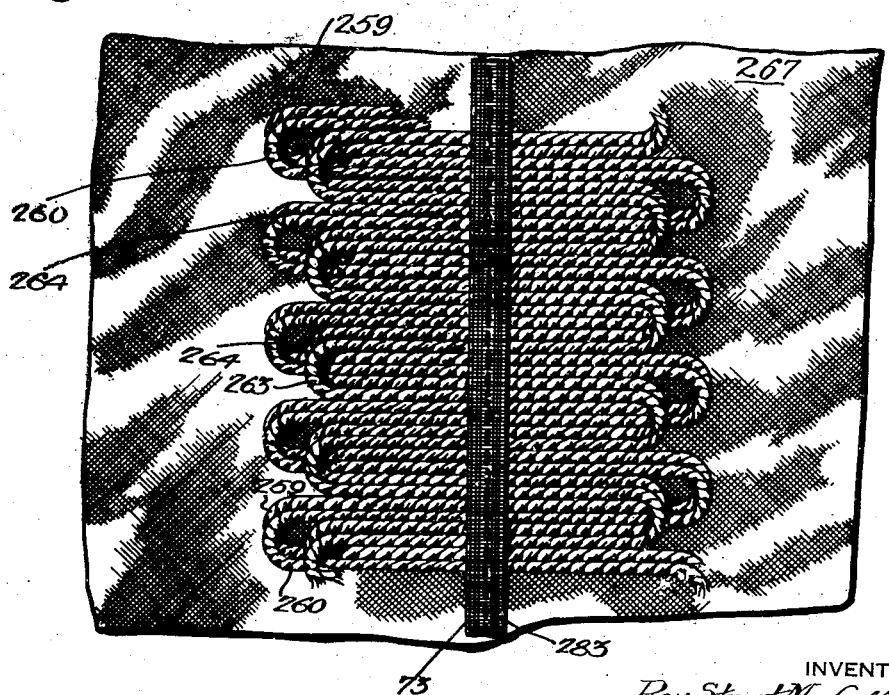
Figure 39:
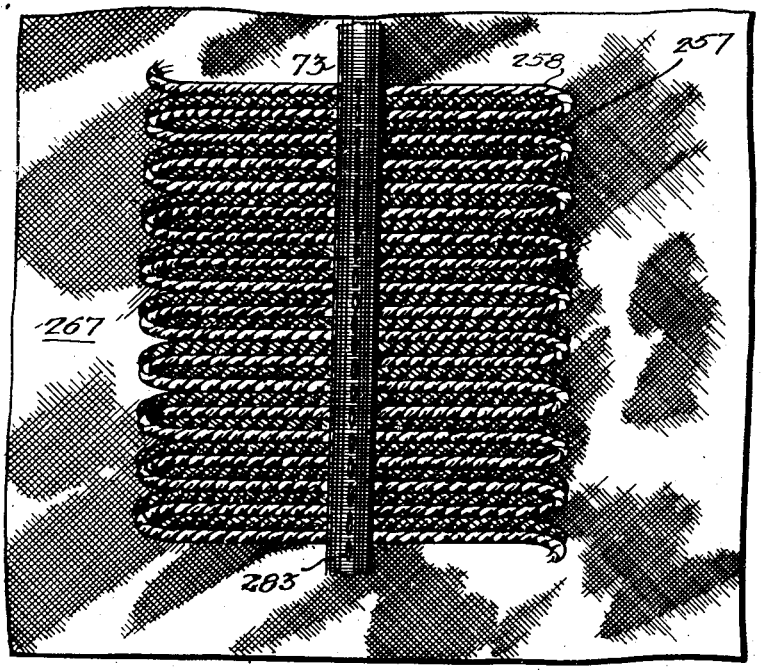

Figures 37 to 39 inclusive are diagrammatic views according to Figure 32, showing various fringes made according to the invention applied as facings.

In the drawings like numerals refer to like parts.

Describing in illustration but not in limitation and referring to the drawings:

The present invention is directed to making of fringe, particularly of the type that is sewed, or otherwise secured, on fabric or the like in rows or according to some design to form the effective face of a rug, such as a bath mat, scatter rug or the like. The fringe may also be employed as a border, edging or other feature on a rug having a face made in some other manner.

In the prior art the common practice in weaving fringe has been to weave a wide fabric having intervals in the warps, and then cut the fabric into two or more fringes, or to weave on a ribbon loom with the heading as the warp, and the loops as filling. These prior art practices are subject to the disadvantage of comparatively low production rate and correspondingly high cost, making it from a cost standpoint somewhat impractical to use fringe as the entire face of the fabric.

By the present invention the production of fringe has been simplified and cheapened, and new effects have been made possible at moderate costs.

In accordance with the invention, yarn is looped back and forth, desirably into a sinuous contour by hook needles, it is then brought in contact with and preferably pressed into contact with the tape having an adhesive face and suitably running transverse to the loops, desirably near their middle, but permissibly offset to one side (Figure 28). The pressing of the yarn against the adhesive of the tape is conveniently carried on by rolls, suitably covered by pressure belts. Once the initial pressure contact between the yarn and the tape is made, supplemental and extended pressure is desirably also secured to allow the adhesive to set and further initially bond to the tape. This is conveniently accomplished by a further pressure belt against a drum.

In accordance with the invention, a plurality of sets of hook needles may be employed, and whether a single set or a plurality of sets be used, a plurality of yarns of the same or different characters will desirably be used. For example, one yarn may be of natural fiber such as cotton or wool and another yarn may be of synthetic fiber such as rayon or nylon. Likewise the yarns may differ in twist, ply, denier or other structural feature, one being for example a plain twist and another a frieze. Likewise one yarn may be of two ply and another may be of three ply of the same or different composition. When a plurality of ends are used they may form different sinuous bend loops, one following another, or a plurality of yarns may be formed into the same loop contour, having the same loop center line, but permissibly one loop being wider than another, so that all yarns can contact the tape.

Where a plurality of yarns are employed, it is also quite desirable in many instances to make loops of different lengths, for example, a short loop in one yarn and a long loop in another yarn, or a short loop in one yarn, an intermediate loop in another yarn, and a long loop in a third yarn. In the finished fabric the combination of short and long loops produces a mottled effect which is very pleasing, particularly as the tendency of the loops to curl or twist varies with the loop length and it is possible to obtain a combination of loops showing variant curling or twisting characteristics. This also gives better coverage for a given weight of yarn per square foot of fabric.

In Figures 1 to 12 inclusive I illustrate the formation of loops by hook needles in accordance with my invention, and the application of the loops against the adhesive on the tape.

In order to avoid unnecessary drawing, it will be understood that since the process can be carried out by hand, the needle and roll positions may also represent the positions of fingers on the human hands of one or several persons.

A lower one of a pair of cooperating rolls 40 is illustrated for placement purposes in these figures, the corresponding upper roll 43 having been removed for convenience in illustration of the formation of the loops. Yarn carrier 44 moves back and forth in front of the rolls between a reciprocating limiting position to the left as best seen in Figure 1 and a reciprocating limiting position to the right as best seen in Figure 8. The length of this reciprocating path can be varied to suit the lengths of the loops, but it will be evident that the yarn carrier moves back and forth once to complete each return bend loop. The yarn carrier 44 has one or preferably a plurality of yarn guiding openings 45 and 46 through which yarns 47 and 48 are guided. While in this illustration a single yarn is shown passing through each yarn guiding opening 45 and 46, it will be evident as later explained that a plurality of yarns may pass through each yarn guiding opening. It will also be understood that the number of yarns 47 and 48 is not limited, and while two are shown in this form, a single yarn may be used or a plurality greater than two may be employed. The yarns 47 and 48 come from any suitable source, not shown in these figures, under suitable drag or tension.

At the opposite ends of the stroke of the yarn carrier 44, the yarns are engaged by holding means to assist in forming the loops. These are preferably needles 49 and 50 on one side and 53 and 54 on the other side, which in this form have hook ends 55 capable of engaging behind the yarns. The needles are respectively mounted on needle carriers 56 and 57, which are respectively pivoted on fixed pivots 58 and 59 about which the needles and the carriers swing. The needles are suitably provided with shanks 60 having elongated eyes 63 which are locked in angularly and longitudinally adjusted position by nuts 64.

The manipulation of the needle carriers about their pivots is desirably accomplished by cams, which conveniently reciprocate with the yarn carrier. The needle carrier 56 is operated by cam 65 through follower 66 of the needle carrier, while the needle carrier 57 is operated by cam 67 through follower 68 on the needle carrier. The cams are oppositely directed and have straight portions 69 which extend in the direction of the reciprocating path and L-bend portions 70 which adjoin the yarn carrier on either side thereof. Thus as long as the follower 66 or 68 is engaging a cam straight portion 69, the corresponding needle carrier will remain in an unchanged loop holding position, but whenever the follower travels in the L-path 70, the needles will swing into or out of yarn loops.

Figure 10:
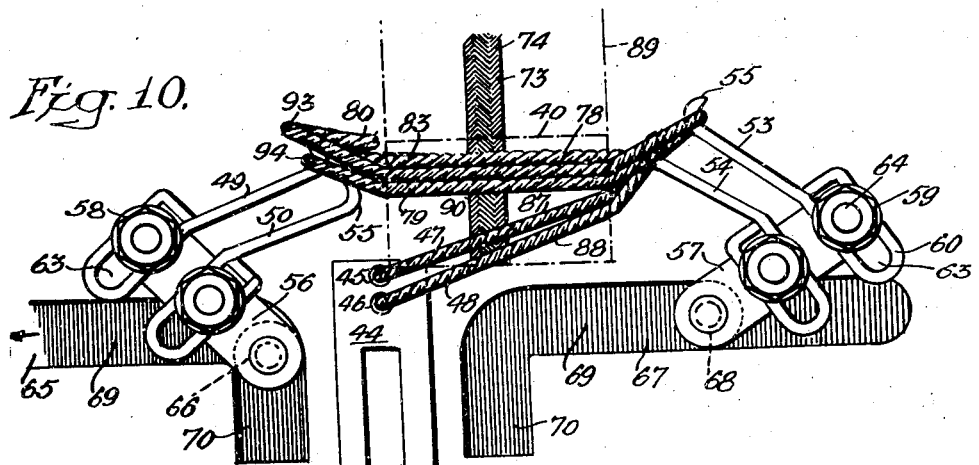
Figure 12:
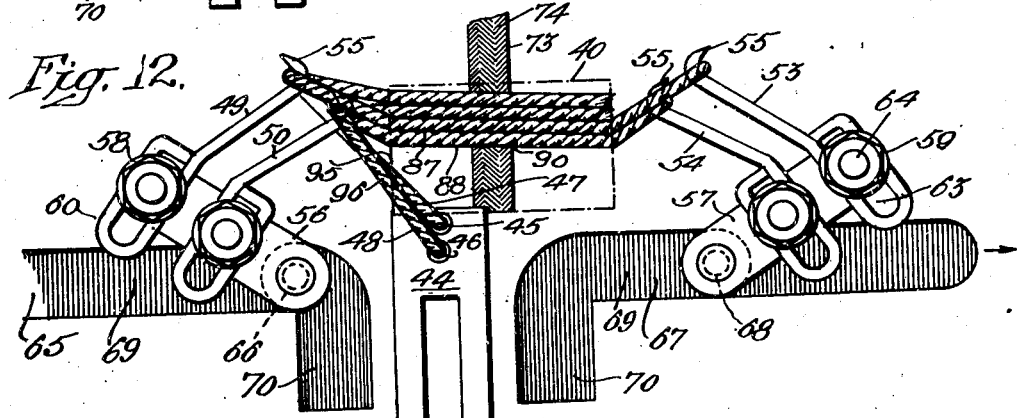

Tape 73 is fed across the bottom roll 40 with an adhesive face 74 uppermost. The tape moves transversely to the roll axis, as best seen in Figures 10, 11 and 12 and preferably is positioned at about the middle of the reciprocating path of the yarn carrier, and of the roll.

As shown in Figure 1, the yarn carrier and cams are there in the limiting position to the left. The follower 68 of the right hand yarn carrier 57 engages the straight portion 69 of the right hand cam 67, maintaining the right hand needles 53 and 54 in their loop holding position. Assuming that the mechanism is starting up, as shown in Figure 1, no loops will be formed over these needles, but as later shown in Figure 11, if the fringe machine has been operating for some time, loops will be held by the needles in this position.

The follower 66 of needle carrier 56 is in its limiting position in the L-portion 70 of the left hand cam 65, maintaining the hook ends 55 of needles 49 and 50 in position immediately prior to engagement behind the yarn. It will be seen that the hook end of needle 49 actually rests upon the yarn 48 at 75, preventing engagement of the hook behind this yarn, and permitting a forward movement of the hook 49 without engagement behind the yarn. Since the hook end of needle 49 never moves further rearward, it never is in danger of improperly hooking behind yarn 48.

Between Figures 1 and 2 yarn carrier and cams begin the movement to the right, the follower 66 beginning its forward travel in the L-cam portion 70 of the cam 65, and the hook portions 55 of needles 49 and 50 engage under the respective yarns 47 and 48 at 76 and 77. This is the first step of loop formation.

In Figure 2 the needles 53 and 54 remain unchanged in position, since the follower 68 is still engaging the straight cam portion 69 at the right. This position of the needles 53 and 54 continues until the position of Figure 7.

By the position of Figure 3, the yarn carrier and cams have moved further to the right, the follower 66 in cam 65 at the left is moved forward in L-portion 70 of the cam, and the hook ends 55 of the needles 49 and 50 engaged behind the yarn have continued forward movement, the yarns feeding out of the guiding openings 45 and 46 to form loop portions 78 and 79 which are beginning to bend and have attained approximately a right angle bend in Figure 3.

Between Figures 3 and 4, the follower 66 on needle carrier 56 has moved further forward and is about to leave L-cam portion 70 of L-cam 65, due to the further travel of the yarn carrier and cams to the right.

The hook portions 55 of needles 49 and 50 have moved considerably forward and also to the left with lengthening of loop portions 78 and 79 of yarns 47 and 48. The loop portions 78 and 79 have now begun a reverse bend with respect to yarn loop portions 80 and 83.

Between Figures 4 and 5, the yarn carrier and cams have moved further to the right and the follower 66 of the left hand needle carrier 56 has engaged the straight portion 69 of cam 65, moving the hook portions 55 and needles 49 and 50 to the limit of their forward and left hand stroke. As the yarn carrier has moved to the right, the loop portions 78 and 79 have further lengthened, and the reverse bends around the hook ends have become very pronounced. The loops 78 and 79 have begun to engage the nip of the rolls at 84 and 85.

Between the positions of Figures 5 and 6, both sets of needles remain in unchanged position, but the yarn carrier continues its movement to the right and lengthens the loop portions 78 and 79.

Between the positions of Figures 6 and 7, further travel of the yarn carrier and cams to the right continues, and the pull of the yarn carrier on the loop portions 78 and 79 held by the hook ends of needles 49 and 50 has drawn the yarn portions engaging at 84 and 85 further into the nip of the rolls until they touch between the rolls against the previous yarn at 86.

The position of needles 49 and 50 does not change, but right hand needles 53 and 54 begin their retractive stroke as follower 68 moves down the L-portion 70 of the right hand cam 67. After the position of Figure 6, the left hand needles 49 and 50 do not move again until the position of Figure 10.

Between Figures 7 and 8, the yarn carrier and cams complete their right hand stroke, being shown in Figure 8 in the right hand limiting position corresponding to the left hand limiting position of Figure 1, with the hook portion 55 of needle 53 resting upon yarn 48 at 75 ready to begin the forward stroke. The follower 68 is now fully retracted in the L-portion 70 of cam 67.

Between Figures 8 and 9, the yarn carrier and cams move to the right, the right hand needles completing their forward and right hand stroke through travel corresponding to that shown in Figures 1 to 5 inclusive for the left hand needles. The result is that loop portions 78 and 79, engaged behind hook portions 55 of needles 53 and 54, have been pulled fully up into the nip of the rolls so that, as shown in Figures 9 and 10, they press forwardly against the previous yarn loop portions 80 and 83 and are held at the left by needles 49 and 50 and at the right by needles 53 and 54. In the meantime, new loop portions 87 and 88 have been formed as the yarn carrier moves toward the left again.

In Figure 10, it is convenient to show the tape 73, which of course has been present in the earlier steps, but has been omitted in Figures 1 to 9 inclusive to simplify the showing. The tape extends between the rolls transversely of their axes and the adhesive face 74 is directed toward the yarn. The most convenient way to accomplish this is to pass the tape below the yarn, as shown in Figure 10, with the adhesive face directed upwardly. While the tape may be of any pressure sensitive adhesive tape character, it will preferably be coated with a wet or tacky adhesive, as later described. This tape will preferably be of cotton, rayon, nylon, jute or other textile, but it may be of sheet such as cellulose acetate, cellulose acetate butyrate, rubber, synthetic rubber (Buna S, Buna N, chloroprene), or the like.

As the yarn loop sections are pulled up into the nip of the rolls, they are pressed by the rolls or by the rolls supplemented by a pressure belt 89, as later described, against the adhesive 74 on the tape 73, so that the loops are firmly engaged against the tape at 90.

Between the positions of Figures 9 and 10, the yarn carrier and cams have moved further to the left, the right hand needles 53 and 54 retaining their positions unchanged, but the left hand needles 49 and 50 beginning their retractive stroke to release the loops at 93 and 94, due to the fact that follower 66 of cam 65 has begun to enter the L-cam portion 70. Due to the further travel of the yarn carrier to the left, loop portions 87 and 88 have lengthened and have moved further into the nip of the rolls.

Between the positions of Figures 10 and 11, the yarn carrier and cams have moved to the limiting left hand position corresponding to Figure 1, and thus completing the full cycle. The position of the right hand needles 53 and 54 is unchanged, but the loop portions 87 and 88 have further lengthened and the hook end 55 of needle 49 again rests over yarn 48 at 75. In this position yarn 48 is held slightly downward by the needle 49, so that on the forward stroke needle 49 can engage under yarn 47.

Between the position of Figures 11 and 12 the yarn carrier and cams have moved toward the right again, needles 49 and 50 have engaged behind yarns 47 and 48, and loop portions 87 and 88 have been pulled by needles 49 and 50 fully into the nip of the rolls, engaging the middle portions of the loops against the adhesive of the tape, and pressing them firmly into the adhesive under the pressure of the rolls. At the same time new loop portions 95 and 96 have begun to form.

Figure 13:
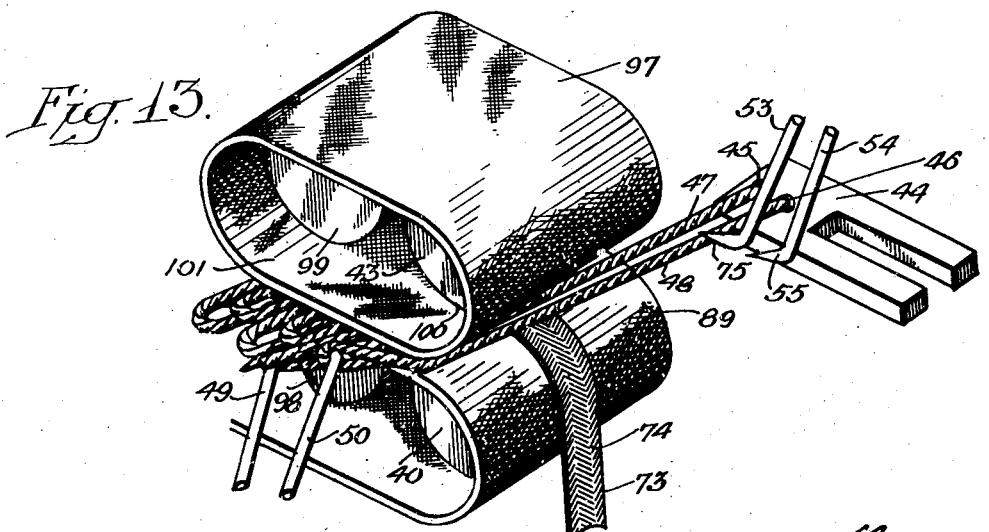
Figure 13 is a fragmentary perspective showing a loop passing into the nip of the rolls.
Figure 14:
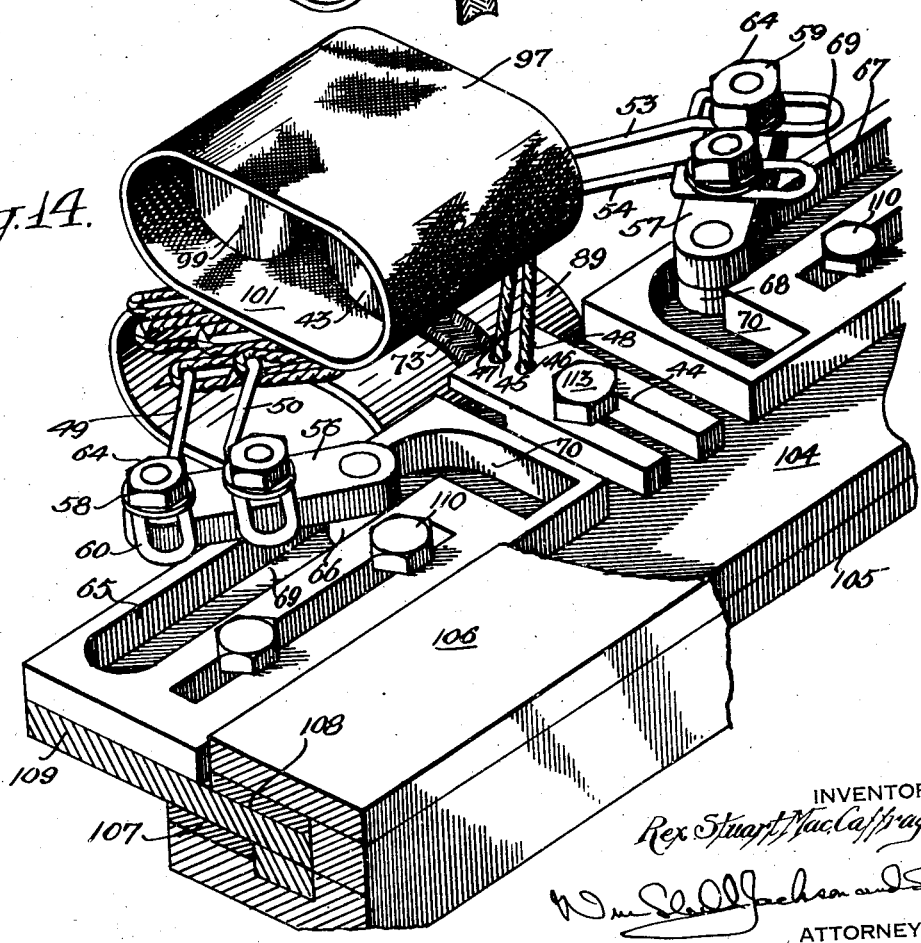
Figure 14 is a fragmentary perspective corresponding to Figure 13, but showing additional structure, and with the fringe advanced by one loop portion with respect to Figure 13.

In Figures 13 and 14, the rolls are illustrated in more detail. As shown, the lower and upper rolls 40 and 43 are supplemented by pressure belts 89 and 97. The belt 89 is suitably stretched by an additional lower roll 98 and the belt 97 is stretched by a cooperating upper roll 99. While the belts conveniently provide uniformity of pressure for a considerable distance forward of the rolls 40 and 43 at 100, and also widen the pressure area at 101 beyond the ends of the rolls, it will be understood that the belts, while desirable, are supplemental to the rolls. Thus as seen in Figures 13 and 14, the needles 49 and 50 at the left, and 53 and 54 at the right swing forward to positions at the edges of the belts and the ends of the rolls and the belts, bringing the middles of the loops into the nip of the rolls and against the adhesive face of the tape 73, and it will be understood of course that the rolls are suitably driven forward to advance the tape and the fringe being formed at a rate which synchronizes with the rate of the formation of the loops.

A convenient structure for the yarn carrier and cams is shown in Figure 14. A carriage 104 having a rigidly attached guide 105 is guided for reciprocation by a guideway 106, having antifriction shoes 107 and 108 for contacting the surface of the carriage and the guide. The carriage overhangs beyond the guideway and toward the rolls at 109, and the cams 65 and 67 are adjustably bolted thereon at 110. The yarn guide 44 suitably overhangs the forward edge of the carriage 104 so that the yarn can be carried up from below without interference by the carriage. The yarn carrier 44 is adjustably bolted on the carriage at 113.

A machine for making the fringe, using the hook needles of my invention is illustrated in Figures 15 to 18 inclusive.

The needle carriers are pivoted on blocks 114 and 115 respectively mounted on the frame 116. The carriage 104 which reciprocates the yarn carrier and cams is reciprocated by an electric motor 117 having a shaft 118 and a pulley 119 driving a belt 120 connecting to a pulley 123 on a shaft 124 in bearings 125. The shaft 124 carries at one end a crank 126 counterweighted at 127 which pivotally connects to a yoke 128 on the end of the carriage 104 by means of a connecting rod 129. The crank turns once for each cycle.

At the opposite end of the shaft 124 from the crank 126, a pulley 130 is provided, which suitably connects as by an angularly disposed belt 133 to a pulley 134 on a shaft 135. A shaft 135 is the input shaft on a speed reducer 136 whose output shaft 137 carries a sprocket 138 driving the chain 139, which connects to a driver sprocket 140 on a shaft 143. The shaft 143 in suitable bearings 144 rotatably carries a drum 145 having a suitably smooth outer circumferential surface 146. It is usually not necessary to heat the drum 145, but it may be heated if desired as by an electric heater 145'. On the opposite end, the shaft 143 carries a pulley 147 which connects by a crossed belt 148 with a pulley 149 on a shaft 150 which mounts the lower rear roll 98, and the lower front roll 40 on shaft 153 interconnects to shaft 150 by sprockets and chain 154 (Figure 15). The shafts 150 and 153 have suitable bearing supports in blocks 114 and 115.

The respective upper rolls 99 and 43 are mounted on shafts 155 and 156 which have bearings supported in floating bearing blocks 157 and 158, which are mounted in vertical sliding position on guides 159 around guideways 160 on the bearing blocks. The bearing blocks are spring urged downwardly by springs 163 adjusted by nuts 164 (Figure 18).

Shaft 156 on roll 43 is intergeared to shaft 153 on roll 40 at one end only by gearing 165, and shaft 155 carrying roll 99 is intergeared to shaft 150 carrying roll 98 by gearing 106 at the opposite end. This structure permits considerable adjustment in roll spacing without loss of intergearing contact at the respective ends, since some flexibility in adjustment is provided by tilting of the blocks.

The respective belts 89 and 97 are arranged as shown in Figures 13 and 14.

Yarn guides for introducing yarn from any suitable spools or the like are shown in Figure 17. One yarn 47 is carried over the yarn guide 167 and pulley 168, while the other yarn 48 is carried over yarn guide 169 and the corresponding coaxial pulley, not shown.

Immediately after the fringe leaves the pressure rolls and pressure belts described, it is carried on to a belt 170, which extends over front roll 173 in bearings 174, is then downwardly turned over roll 175 on shaft 176 in suitable bearings, not shown, then is carried around the circumferential surface 146 of the drum 145, is next reversed over tension roll 177, and finally returned to the front roll over return path rolls 178 and 179 on suitable bearings, not shown.

The belt is tensioned by a lever 180, pivoted at 183, having a weight at 184 at its outer end and pivotally supporting the tension roll 147 at its opposite end.

The path of the belt 170 is well shown in Figure 19 where the directions of motion are indicated by the arrows.

Tape 73 desirably enters the machine at the rear, passing over a guide 185 and in contact with an idler roll 186 partially immersed in a tank 187 of adhesive 188. The tape is downwardly deflected against the roll 186 by another guide 189 and then carried over the surface of a different roll 190 partially immersed in the adhesive. The tape is next carried under a further guide 193 and over a doctor blade 194, which scrapes off excessive adhesive from the bottom of the tape and returns the adhesive to the main body of adhesive. The tape having adhesive coating on one surface is carried over guide rolls 195 with the adhesive surface away from the rolls, and then fed through initial pressure rolls 40 and 43 as described. Desirably no adhesive is present on the side of the tape against the roll 40.

The belt 196 for driving the roll 190 and for applying the adhesive connects between the pulley 197 on shaft 143 and a pulley 198 on the same shaft (not shown) as roll 190.

After the fringe has been cemented to the tape and the completed fringe has passed to additional drum surface 146 and to belt 170, the completed fringe is taken up, wound upon a pickup roll 199, rotatably mounted on an arm 200, pivoted at 183 and weighted at 203. The outer surface 204 of the roll 199 rotates against the top of the drum and is turned by the drum.

In operation, the yarns from suitable spools or the like and suitably tensioned are carried through the yarn guides 167 and 169 and over the guiding pulleys, threaded up through the yarn guiding openings 45 and 46 of the yarn carrier 44, and carried into the nip of the rolls with the yarn carrier in the position of Figure 1. The tape is likewise carried through the adhesive applicator and over the guides and doctor blade and brought up into the nip of the rolls belows the yarn as best seen in Figures 13 and 14.

The machine is then started, the needles moving forward and backward as the yarn carrier moves back and forth, forming loops as described, which are pushed forward into the nip of the rolls against the adhesive face on the tape, and by pressure of the rolls and the pressure belts are brought into very firm contact with the adhesive on the tape.

The adhesive will preferably comprise natural rubber latex, chlorinated natural rubber, synthetic rubber or chlorinated synthetic rubber, or a thermosetting adhesive such as an alkyd modified urea-formaldehyde, or a phenol-formaldehyde adhesive, with suitable compounding ingredients as well known. In many cases, the time of maintenance of pressure by the rolls and by the cooperating pressure belts adjacent the needles will not be adequate to permit the adhesive to set or reach maximum strength. It is therefore, very desirable before the fringe is subjected to transportation, or rough handling incident to stitching or other fabrication steps, to carry the fringe under further pressure for an additional length of time while the adhesive sets. It will be evident, however, that the fringe is fully formed when it leaves the initial pressure rolls and pressure belts, and the supplemental pressure merely aids in more firm and reliable binding of the sinuous loops by the adhesive on the tape.

It will be evident that as the loops are formed, and applied to the tape, they lie in the same plane on the tape. As the hook needles advance they swing beyond the roll axes at the ends of the rolls.

The structure of Figures 1 to 19 need not be used, as the process can be carried out by hand, without necessarily using this particular mechanism. In that case the loops are formed, held and advanced by the fingers.

Accordingly the fringe is carried forward over the belt 170, and moves around the circumferential surface 146 of the drum between the drum, on the inside, and the belt 170 on the outside, until at the top of the drum it is wound on the takeup roll 199.

Figure 20:
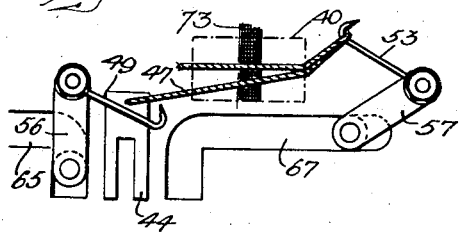

While in the form of Figures 1 to 19 inclusive I show two separate loops of different loop lengths, in Figure 20 I illustrate formation of loops from a single yarn, using a single set of hook needles. Here I illustrate the hook needles 49 and 53 engaging yarn 47 and omitting the yarn 48. It will be understood, of course, that when a single yarn is used, the rate of progress of the rolls, drum and pickup will be adjusted so that the desired close spacing of the yarn on the tape will be obtained.

Figure 21:
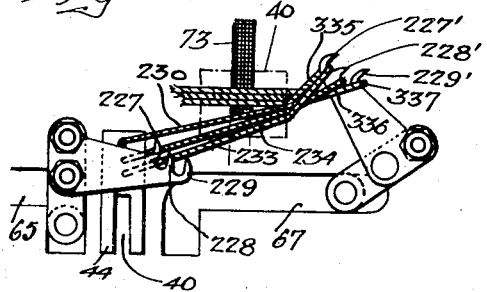

I may, if desired, employ some other number of needles. In Figure 21, I show three sets of needles 227, 228 and 229 and 227', 228' and 229', operating on yarns 230, 233, 234, formed into loops 235, 236, 237 of unequal lengths, and applied to the tape.

Figure 22:
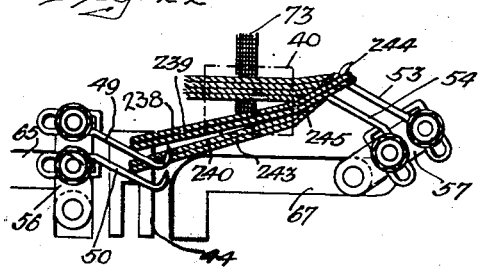

If desired, some other number of ends may be employed, and with a lesser number of needle sets than the number of ends. In Figure 22, I show two sets of needles 49, 53, and 50, 54, each operating, however, on two yarns respectively, 238, 239 and 240, 243, forming double yarn loops 244 and 245 of unequal lengths.

Figure 23:
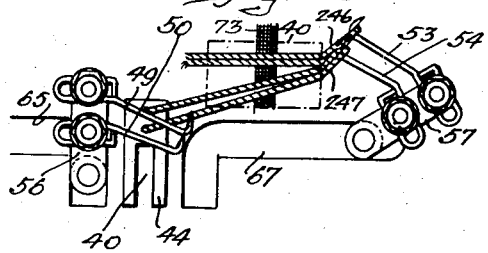

If desired, I may use the exact arrangement of Figures 1 to 19 inclusive, but arrange the respective needles to form loops 246, 247 of equal lengths, as shown in Figure 23.

Figure 24:
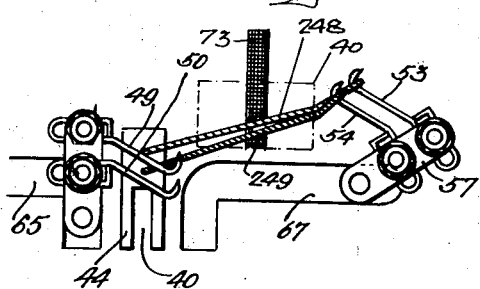
Figure 25:
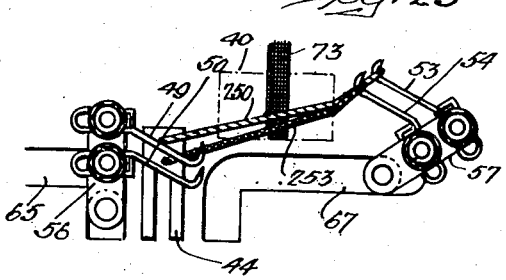
Figure 26:
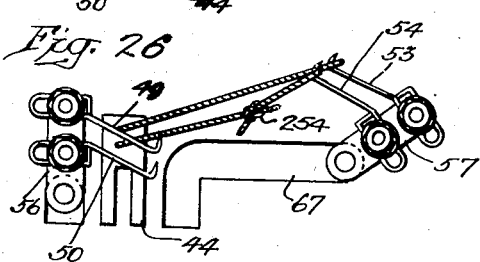

In the previous illustration distinction has been made between the characters of yarn, but in Figure 24, I show two yarns of different character being formed on two sets of hooks. In this form, one yarn 248 is a plain twist and another yarn 249 is of a different twist, for example a frieze. In Figure 25, the arrangement is the same, only one yarn 250 is of one material, for example of natural fiber such as cotton, linen, silk, wool, or the like, while another yarn 253 is of another material, for example of synthetic fiber, such as rayon, nylon (linear polyamide) or polyvinyl plastic. Likewise yarn 250 may be of one natural fiber such as wool, and yarn 253 of another such as cotton.

It frequently happens in the operation of the mechanism of any of the forms shown that a yarn spool becomes exhausted. It is then simply necessary to knot the end of the next yarn as shown at 254 in Figure 26 and the knot will pass through the machine and usually be unnoticed in the final product. In any case subject to the possible necessity of cutting out the knot at assembly of the rug, the machine will feed continuously without rethreading by simply knotting when a break in the yarn is encountered.

In Figure 27, I illustrate a fragment of the fringe formed in Figures 1 to 19 inclusive, having respective loops of different lengths 255 and 256 made from different yarns attached by the adhesive to the tape 73. This gives better coverage of the yarn than with loops of equal lengths.

Figure 28 shows a fringe similar to that of Figure 27, except that the loops 257 and 258 are of equal lengths. To show that the tape may be offset to one side, it is shown in this view offset at 73'.

Figure 29 shows a fringe as produced in Figure 22, showing four yarns formed on two sets of hooks into loops 259, 260, and 263, 264 of unequal lengths. Each pair of yarns follows the same path in sinuous bending, two paths being provided.

Figure 30 illustrates a fringe made in accordance with Figure 24 or 25, showing two yarns 265 and 266 of different characters, whether due to the nature of the material or the construction of the yarn, such as the difference in denier, ply or twist. To show that a tape may be cemented to both sides of the loops in any form by running an additional tape over the upper roll with the adhesive face down, I show a tape $73^2$, broken away, but intended to extend over the top of the loops in this figure, and supplement the tape 73 below the loops. This will secure loops which do not lie in a place, but are crowded or bunched.

Figure 31 illustrates a fringe made in accordance with Figure 20, consisting of a single yarn 47 in loops 78 cemented to the tape.

In Figure 32 an enlarged fragment is shown of the rug or other final fabric in which the fringe according to the present invention is employed. A suitable backing 267, for example a fabric such as burlap, canvas, duck or the like, has stitched to it a plurality of lines of fringe, only one of which is shown. In stitching the fringe to the backing, I find it very desirable to place the tape 73 uppermost and to stitch through the tape and the yarn to the backing, as shown by the line of stitching 268, so that the stitching supplements the action of the adhesive in holding the yarn in place and the tape tends to pin down the yarn. As shown, the loops of the yarn naturally form in a nonuniform contour, which is very attractive in the final product. The particular tape has short loops 269 and long loops 270, the short loops having a less pronounced tendency to twist or curl than the long loops.

A rug using the fringe made in accordance with the invention in its face is shown in Figure 33, and consists of a heterogeneous entangled mass of loops 28 on the face of the fabric which conceals the tape and the backing. The lines of stitching 283 uniting the fringe to the body of the backing 267 are shown in the upper left hand portion of the figure, and the line 284 is illustrated for stitching the fringe around the edge. The stitched line 285 is intended to indicate the hem line of the backing fabric.

The corner formation is conveniently illustrated in Figures 34 and 35, which are enlarged fragments looking from the back of the backing fabric and showing the loops 286 of the edge fringe extending beyond the backing. Here, as shown, parallel stitched lines 283 indicate the lines of the fringe over the body of the backing fabric, while a stitched line 285 shows the hem line of the backing fabric. A stitched line 287, in Figure 34 near the edge and parallel to the stitched lines 283, indicates that a fringe has been carried along that edge to provide a border and a stitched line 288 at the end transverse to the stitched lines 283, indicate that a fringe has been carried along that edge to provide a border, thus covering the ends of the tapes which extend longitudinally.

In Figure 35 the stitched line 284 indicates that the fringe which provides the border, is carried along the longitudinal edge around the corner and across the transverse edge, thus covering the backing and covering the ends of the longitudinal tapes.

Figure 36 shows the fringe made in accordance with the invention applied at 289 to a rug whose face is made of some other suitable material, or by some other method, and thus is intended to illustrate that the fringe made according to the invention has general utility and is not limited to forming the face of the fabric.

In Figure 37 I show a fragment of fabric made from the fringe of Figure 28 stitched on a backing fabric.

In Figure 38 I show a fabric similar to Figure 36, but applying the fringe as made in Figure 29.

In Figure 39, I illustrate the fringe as made in Figure 30, applied to a fabric.

It will be evident that I have illustrated several different methods and mechanisms for producing fringe which can be applied in various ways in making fabric. These variations are suggestive of the wide utility of the invention.

In view of my invention and disclosure variations and modifications to meet individual whim or particular need will doubtless become evident to others skilled in the art, to obtain all or part of the benefits of my invention without copying the process and machine shown, and I, therefore, claim all such insofar as they fall within the reasonable spirit and scope of my claims.

Having thus described my invention what I claim as new and desire to secure by Letters Patent is:

1. In a fringe machine, a pair of cooperating rolls, means for feeding tape through the rolls transversely to the axes, the tape having adhesive on one face thereof, a yarn carrier, means for moving the yarn carrier back and forth in front of the rolls, hook needles pivoted at the opposite ends of the rolls and means for swinging the hook needles alternately at the opposite ends of the rolls behind the yarn to engage it and form loops and toward the nip of the rolls to introduce the loops between the rolls against the adhesive side of the tape and thereby affix the yarn to the tape.

2. In a fringe machine, cooperating rolls, means for feeding tape having adhesive on one side thereof transversely to the axes through the rolls, a yarn carrier, means for reciprocating the yarn carrier back and forth in front of the rolls, hook needles at opposite ends of the rolls, pivotal means for supporting the hook needles and cam means for swinging the hook needles about their pivots to form loops of the yarn and to carry the loops into the nip of the rolls against the adhesive on the tape, the cams moving the hook needles forward alternately at opposite positions of the yarn carrier.

3. In a fringe machine, a carriage, means for reciprocating the carriage, a yarn carrier intermediate the ends of the carriage and mounted thereon, cams on the carriage on opposite sides of the yarn carrier, needle carriers pivoted adjacent the ends of the stroke of the yarn carrier, followers on the needle carriers and riding the cams, hook needles on the needle carriers, means for feeding tape having adhesive on one face through the space between the needles with the adhesive face toward the yarn, and means for pressing yarn from the yarn carrier formed into loops by the needles against the adhesive on the tape.

4. In a fringe machine, a carriage, means for reciprocating the carriage, a yarn carrier supported on the carriage, oppositely directed L-cams on the carriage on opposite sides of the yarn carrier, pivoted oppositely directed needle carriers adjacent the opposite limiting positions of travel of the yarn carrier, followers on the needle carriers on the opposite ends from the pivots engaging the respective L-cams, opposite directed needles on the needle carriers adapted to engage the yarn from the yarn carrier, form loops and carry them forward, means for progressing tape having one adhesive face through the space between the needles and along the edge of the loops with the adhesive face toward the yarn, and means for pressing loops at a position intermediate between their ends against the adhesive on the tape.

5. In a fringe machine, a carriage, means for reciprocating the carriage, a yarn carrier supported thereon, oppositely directed L-cams on the carriage on opposite sides of the yarn carrier, pivoted oppositely directed needle carriers adjacent the opposite limiting positions of travel of the yarn carrier, followers on the needle carriers on the opposite ends from the pivots engaging the respective L-cams, oppositely directed hook needles on the needle carriers adapted to engage the yarn from the yarn carrier, form loops and carry them forward, means for progressing tape having one adhesive face through the space between the needles and along the middle of the loops with the adhesive face toward the loops, and cooperating pressure belts for pressing the yarn of the loops against the adhesive on the tape.

6. In a fringe machine, a pair of cooperating hook needles oppositely directed toward one another, a yarn carrier, means for moving the yarn carrier back and forth to limiting positions beyond the hook needles, means for swinging the hook needles to engage behind the yarn and form loops and to move the loops forward, cooperating pressure belts adapted to receive the loops as they are carried forward by the hook needles, and means for feeding tape having adhesive on one side between the pressure belts with the adhesive face toward the yarn to be bonded thereto.

7. In a fringe machine, a carriage, means for reciprocating the carriage, a yarn guide mounted thereon, a pair of oppositely directed cooperating needle holders pivoted adjacent the limits of travel of the yarn guide, oppositely directed hook needles mounted on the needle holders and adapted to engage the yarn, form loops and carry the loops forward, cooperating cam means between the carriage and the needle carriers for swinging the needle carriers as the carriage reciprocates, cooperating pressure belts adapted to receive the loops as they are carried forward, and means for feeding tape having adhesive on one side through the pressure belts for bonding by the adhesive to the yarn.

8. In a fringe machine, a multiple yarn carrier for feeding a plurality of yarns, means for moving the yarn carrier back and forth, pivoted hook needles adjacent the opposite ends of the travel of the yarn carrier, means for swinging the needles to form loops from a plurality of yarns simultaneously, means for feeding tape having adhesive on one face, forward transversely of the loops and means for pressing the yarn of the loops against the adhesive of the tape.

9. In a fringe machine, a multiple yarn carrier for feeding a plurality of yarns, a carriage mounting the yarn carrier, cams on the carriage on the opposite sides of the yarn carrier, means for reciprocating the carriage, pivoted needle carriers adjacent the ends of the stroke of the yarn carrier, followers on the needle carriers engaging the cams, a plurality of oppositely disposed hook needles on each needle carrier for forming and advancing loops, means for progressing tape having adhesive on one face through the space between the needles wtih the adhesive face toward the loops and means for pressing the loops against the adhesive on the tape.

10. In a fringe machine, a pair of cooperating rolls, means for feeding tape having adhesive on one face through the rolls, a multiple yarn carrier for feeding a plurality of yarns, means for reciprocating the yarn carrier in front of the rolls, a plurality of hook needles at the opposite ends of the rolls and means for engaging separate yarns on the hook needles, forming separate loops of different loop length, and carrying the loops into the nip of the rolls to engage the adhesive on the tape.

11. In a fringe machine, a multiple yarn carrier feeding a plurality of yarns, means for reciprocating the yarn carrier, a pair of cooperating pivoted needle carriers adjacent the ends of the stroke of the carrier, a plurality of hook needles on each needle carrier mounted at different distances from the pivot, means for moving the needles to engage different yarns and at different positions to form loops of different lengths and to progress the loops forward, means for advancing tape having adhesive on one face transversely of the loops with the adhesive face toward the yarns and means for pressing the loops against the adhesive on the tape.

12. In a fringe machine, a carriage, means for reciprocating the carriage, a multiple yarn carrier on the carriage having guides for a plurality of yarns, oppositely directed cooperating needle carriers pivoted adjacent the limiting positions of the yarn carrier, cam means cooperatively acting between the carriage and the needle carriers to swing the needle carriers alternately about their pivots, a plurality of hook needles mounted on each needle carrier at different pivotal distances and swinging to different positions to form loops of different lengths from the different yarns, means for progressing tape having adhesive on one face through the space between the needles with the adhesive face toward the yarns and means for pressing the loops of different lengths formed by the needles from the different yarns against the adhesive of the tape.

13. In a fringe machine, a pair of aligned cooperating rolls, a yarn carrier having means for feeding a plurality of yarn and having a range of motion in front of the rolls to positions beyond the rolls at either end, means for moving the yarn carrier back and forth over its range of motion, a plurality of hook needles at each end of the rolls having a hook motion from a position engaging the yarn when the yarn carrier is near the adjacent end of its range of motion to a position on the opposite sides of roll axes at the ends of the rolls at which a plurality of loops are pulled into the rolls, the lateral motions of the different hooked needles at a given end of the rolls being different so as to make loops of different lengths, a hook needle operating mechanism coordinated with the means for moving the yarn carrier to hook the needles behind the yarns when the yarn carrier is near the adjacent end of its range of motion and move the needles across the ends of the rolls and means for feeding tape having adhesive on the side toward the yarn through the rolls transversely to the roll axes and to the loops being formed, whereby the hook needles form the loops and pull them into the nip of the rolls.

REX S. MacCAFFRAY, JR.

REFERENCES CITED

The following references are of record in the file of this patent:

UNITED STATES PATENTS

| Number | Name | Date |
|---|---|---|
| 810,935 | Goldman | Jan. 30, 1906 |
| 1,618,903 | Ammann-Haberstich | Feb. 22, 1927 |
| 1,804,916 | Cotte | May 12, 1931 |
| 1,929,323 | Maier | Oct. 3, 1933 |
| 2,429,281 | Solins | Oct. 21, 1947 |

FOREIGN PATENTS

| Number | Country | Date |
|---|---|---|
| 678,717 | France | Jan. 2, 1930 |
| 500,199 | Germany | May 28, 1930 |